(12) United States Patent
Mainini et al.

(10) Patent No.: US 6,345,946 B1
(45) Date of Patent: Feb. 12, 2002

(54) FASTENER

(75) Inventors: Christopher E. Mainini, Knoxville, TN (US); Lawrence E. Towle, San Diego, CA (US); William S. Groh, Knoxville; David L. Druif, Loudon, both of TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 09/631,488

(22) Filed: Aug. 3, 2000

(51) Int. Cl.[7] .................. F16B 19/00; F16B 21/00
(52) U.S. Cl. ............... 411/508; 411/339; 411/553; 411/913
(58) Field of Search ................. 411/338, 339, 411/508, 509, 510, 551, 552, 553, 913

(56) References Cited

U.S. PATENT DOCUMENTS

| | | |
|---|---|---|
| 3,499,246 A | 3/1970 | Loukas |
| 3,985,174 A | 10/1976 | Bricker |
| 4,053,007 A | 10/1977 | Griffith |
| 4,334,573 A | 6/1982 | Hackman et al. |
| D267,436 S | 12/1982 | Thorne |
| 4,603,724 A | 8/1986 | Borwich |
| 4,754,797 A | 7/1988 | Sronce |
| 4,760,872 A | 8/1988 | Hale, Jr. |
| 4,840,217 A | 6/1989 | Evans, III |
| 4,878,792 A * | 11/1989 | Frano ................ 411/913 X |
| 4,893,978 A * | 1/1990 | Frano ...................... 411/553 |
| 5,117,890 A | 6/1992 | Taylor |
| 5,143,500 A * | 9/1992 | Schuring et al. ....... 411/913 X |
| 5,197,840 A * | 3/1993 | Peek ....................... 411/508 X |
| 5,469,659 A | 11/1995 | Reid et al. |
| 5,511,919 A * | 4/1996 | Scalise ................... 411/553 X |
| 5,535,804 A | 7/1996 | Guest |
| 5,701,702 A | 12/1997 | Reid et al. |
| 5,701,813 A | 12/1997 | Smith |
| 5,946,856 A | 9/1999 | Davlantes |
| 6,123,492 A * | 9/2000 | Pickard ....................... 411/508 |

* cited by examiner

Primary Examiner—Neill Wilson
(74) Attorney, Agent, or Firm—Pitts & Brittian, P.C.

(57) ABSTRACT

A fastener which allows for the attachment of two articles without the need for hardware such as a screw, or such as nuts, bolts and washers. The fastener comprises two members—a fastener post which serves as a male member, and a fastener post receiver which serves as a female member. The male post defines two elongated prongs, with each prong having a flange near its end. The female receiver is configured to mate with the prongs of the post. To this end, the receiver has walls which extend from a base, with the walls having a series of teeth for receiving the flanges of the post as the post is advanced into the female receiver. In addition, the walls of the female receiver are separated by channels. The channels allow the walls of the receiver to pivot about the base. This feature, in turn, allows the walls to contract and engage the male post when one attempts to separate the male post from the female receiver. In this way, the fastener post is held within the receiver in essentially secure fashion without hardware. An additional feature of the fastener is that the male and female members can be quickly and easily disconnected. This is accomplished by rotating the male post so as to disengage the teeth from the wall portions of the receiver. The post can then be slidably removed from the receiver.

23 Claims, 4 Drawing Sheets

FASTENER

CROSS-REFERENCE TO RELATED APPLICATIONS

This Application is related to the Application entitled "Easy Installation Pet Door," being co-owned by the same Assignee, and being filed simultaneously herewith.

STATEMENT REGARDING FEDERALLY SPONSORED RESEARCH OR DEVELOPMENT

Not Applicable.

BACKGROUND OF THE INVENTION

1. Field of Invention

The present invention relates to fasteners. More specifically, the present invention relates to fasteners which allow two articles to be operatively engaged without the use of bolts, nuts, washers, or other hardware.

2. Description of the Related Art

The use of fasteners to allow two separate articles to be operatively engaged is well-known. Perhaps the most common fastener arrangement involves a threaded bolt and a corresponding nut. For example, one desiring to put together pieces of a child's plastic toy box or a picnic table would commonly use nuts, bolts and washers.

The cost of products to consumers is increased when a product requires hardware for assembly or installation. Further, the presence of hardware requires the use of tools such as wrenches and/or screwdrivers. Therefore, an alternative to hardware fasteners is needed.

Hook and loop pieces have recently been utilized as a fastener device. However, such fasteners are limited in their application to lighter-weight connections such as fabric. A need remains for a fastener which is inexpensive to produce and which does not require tools for installation.

Therefore, it is an object of the present invention to provide a fastener having two pieces for connecting two separate articles which does not require tools such as wrenches and screwdrivers for attachment.

It is another object of the present invention to provide a fastener which can be installed without the need for hardware such as a screw, or such as nuts, bolts and washers, and without the need for tools to manipulate such hardware.

Still further, it is an object of the present invention to provide a fastener which is more economical for the consumer in that it is manufactured from a durable plastic rather than a metallic substance.

It is yet another object of the present invention to provide a fastener which readily connects and disconnects two separate articles, bringing them quickly into and out of operative engagement.

BRIEF SUMMARY OF THE INVENTION

Other objects and advantages of the present invention will become more apparent upon reviewing the detailed description and associated figures of the improved fastener. The device of the present invention provides two members, one member representing a male connecting piece, and the other member representing a female receiving piece. The male member defines a post, while the female member is a post receiver.

The individual fastener post and receiver are configured to mate securely, meaning that considerable force is required to separate the male and female members. To accomplish this, the fastener post first defines two elongated prongs extending from a base, with each prong having a flange near its end. In turn, the post receiver defines two wall portions which receive the two elongated prongs. Each wall portion contains a series of teeth which catch the flanges on the post so as to hold the post securely within the post receiver.

Containment of the post within the receiver is made more secure by the placement of channels separating the wall portions of the receiver. The result is that any attempt to withdraw the post from its receiver only draws the wall portions of the receiver in tighter against the two prongs, effectively preventing separation of the fastener members without great force. At the same time, the fastener of the present invention is designed to allow the fastener post and the receiver to be quickly released from each other. The post can be quickly and easily disengaged from the receiver by simply rotating the post about 90°. This has the effect of releasing the flanges on the post from within the teeth, allowing the post to slide out of the receiver with minimal effort.

In order to attach two articles together using the male post member and female receiver member, the male fastener post is attached to one article while the female post receiver is attached to another article. The fastener post and the post receiver are then aligned and mated, allowing the first and second articles to be attached.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
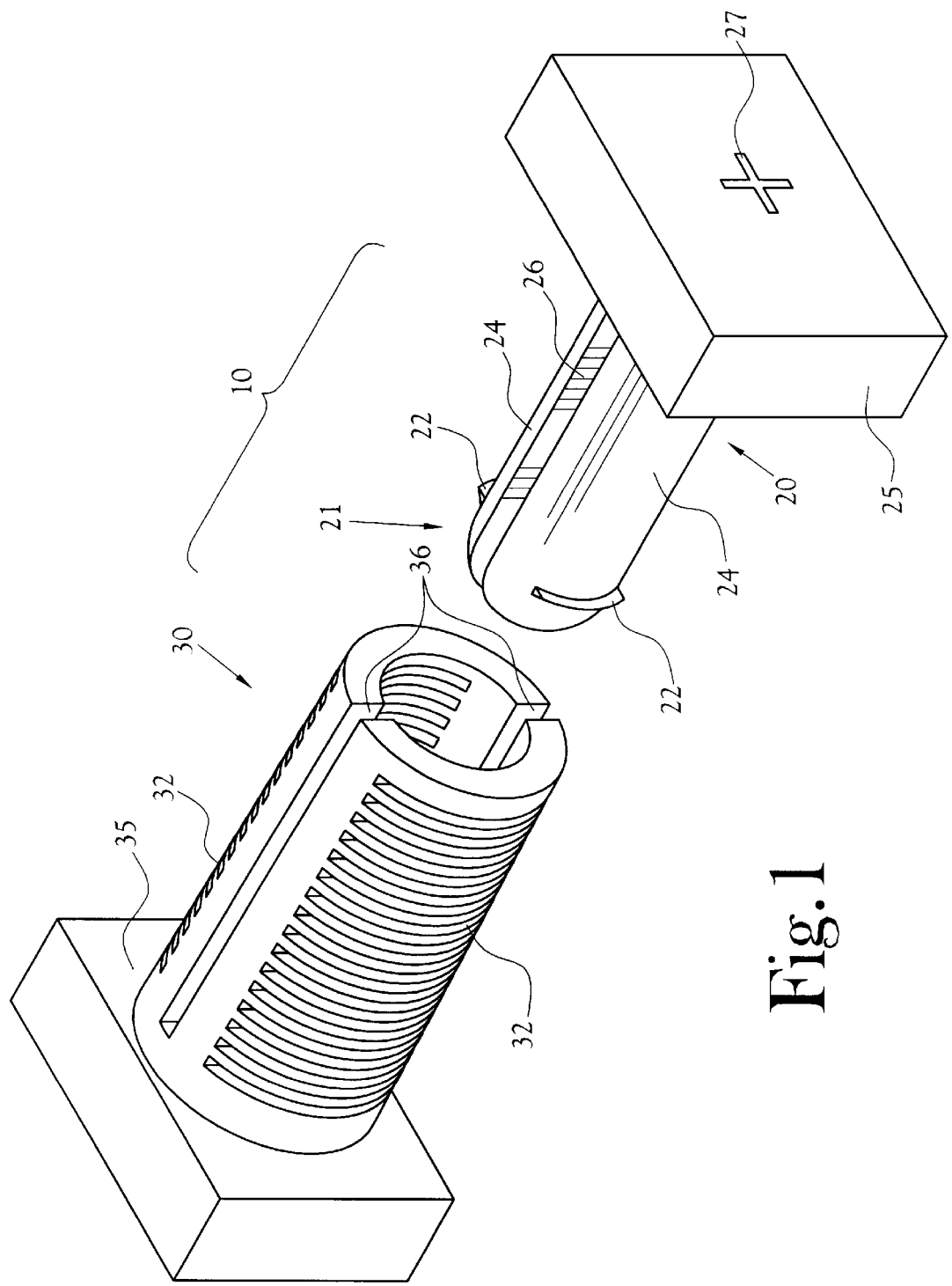
FIG. 1 is a perspective view of a fastener of the present invention, with the male and female members separated.

An improved fastener of the present invention is illustrated generally at 10 in FIG. 1. The fastener 10 is designed to provide a means for quickly connecting two separate articles (not shown) in secure fashion.

As demonstrated in FIG. 1, the fastener 10 of the present invention is comprised of two members—a male member 20 and a female member 30. The male member 20 is a fastener post 20, while the female member 30 is a post receiver 30. FIG. 1 demonstrates the alignment of a fastener post 20 and a post receiver 30 to allow for mating of the two members 20 and 30.

Figure 2:
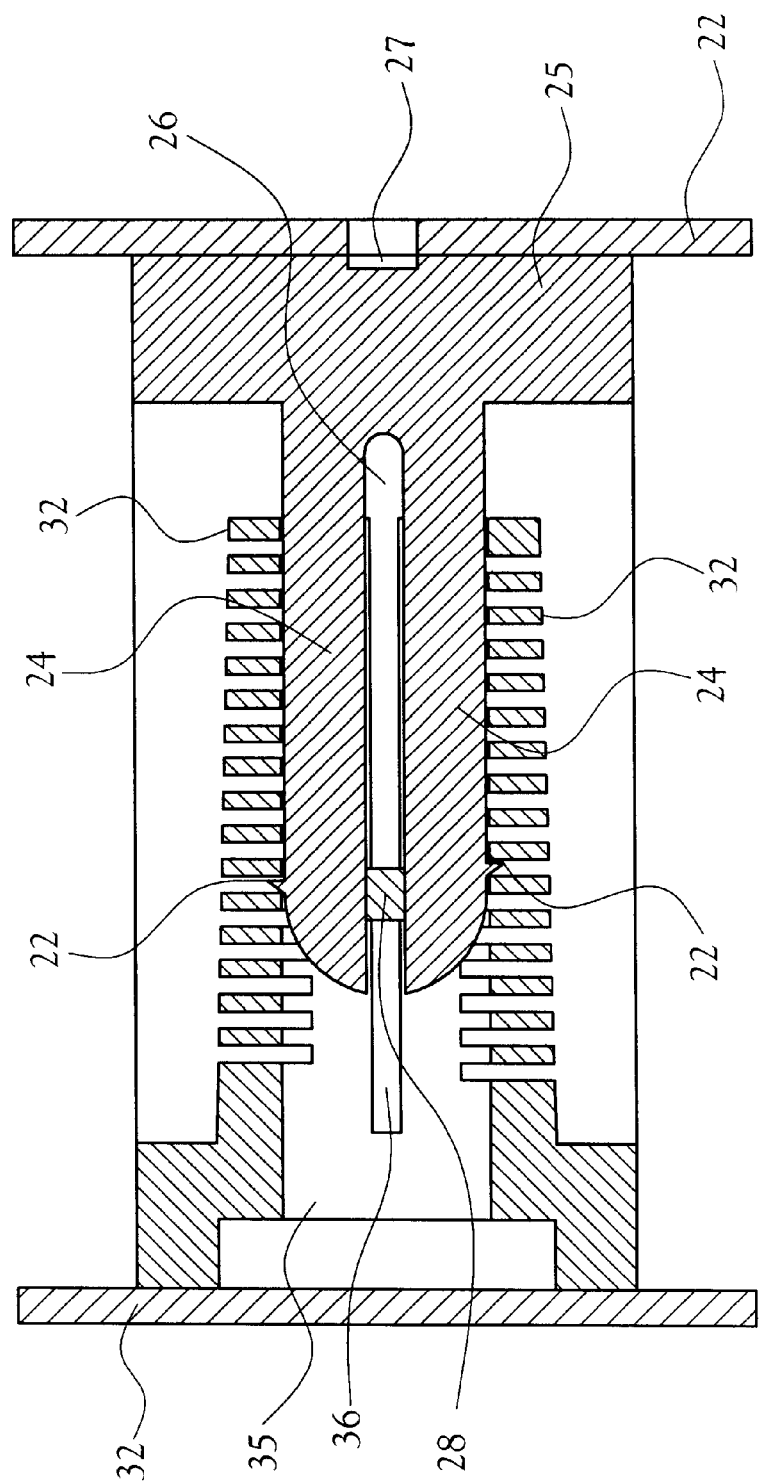
FIG. 2 is a cross-sectional view of a fastener of the present invention, with the male fastener post inserted into the female post receiver.

FIG. 2 is a cross-sectional view of a fastener 10 of the present invention. By FIG. 2 it is seen that the post receiver 30 is configured to mate with the post 20. In the preferred embodiment, both the post 20 and the receiver 30 are fabricated from a polymer to form a flexible plastic.

However, it is understood that the fastener 10 of the present invention may be constructed of any rugged and non-shattering material.

Figure 3:
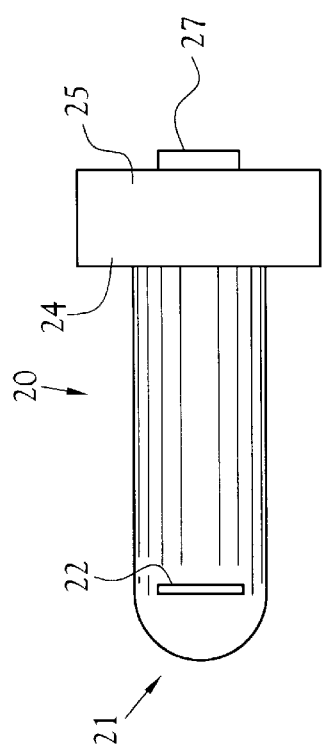
FIG. 3 is a side view of a fastener post of a fastener.
Figure 4:
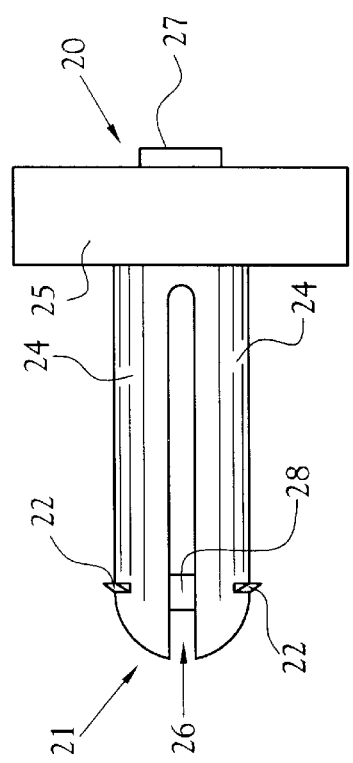
FIG. 4 is a top view of a fastener post of a fastener.
Figure 5:
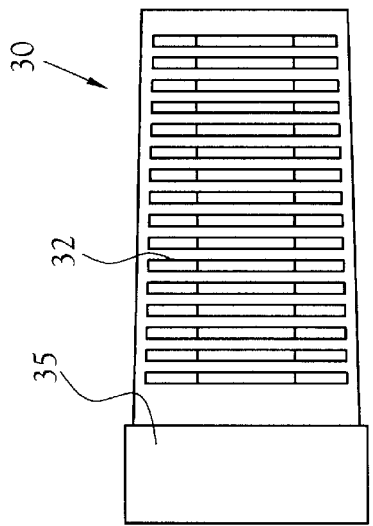
FIG. 5 is a side view of a post receiver of a fastener.
Figure 6:
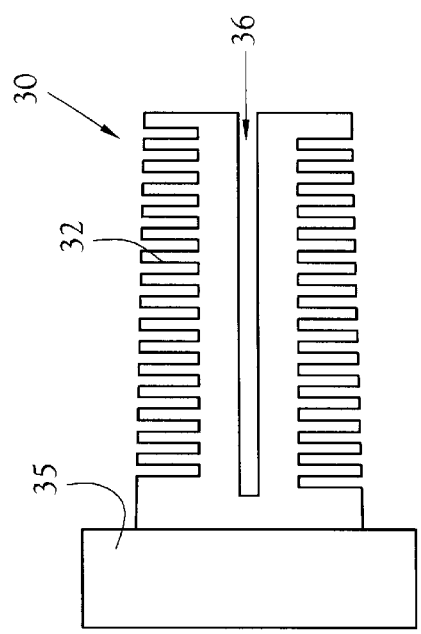
FIG. 6 is a top view of a post receiver of a fastener.

The post 20 and receiver 30 are configured to mate securely by a novel ratchet arrangement. This ratchet arrangement first provides for at least two flanges 22 near the distal end 21 of the post 20. The flanges 22 are depicted in the side view of FIG. 3 and the top view of FIG. 4. The flanges 22 are caught within the post receiver by a series of teeth 32 manufactured within wall portions 34 of the post receiver 30. The teeth 32 are depicted in the side view of FIG. 5 and the top view of FIG. 6. The flanges 22 progress along the teeth 32 as the post 20 is advanced into the receiver 30. In the preferred embodiment, the teeth 32 are staggered between the wall portions 34 to further facilitate a ratcheting engagement.

Containment of the post 20 within the receiver 30 is made even more secure by the placement of wall channels 36 within the post receiver 30. These wall channels 36 serve to separate the wall portions 34 of the receiver 30. The wall portions 34 are connected to the base 35 of the fastener post receiver 30, but are otherwise separated by the wall channels 36. In this manner, the wall portions 34 can actually pivot inward about the base 35. The result is that any attempt to withdraw the post 20 from its receiver 30 only draws the wall portions 34 of the receiver 30 in tighter against the post 20, effectively preventing separation of the two fastener members 20 and 30 without great force. Hence, the fastener post 20 and the post receiver 30 combine to form a novel ratchet fastener 10.

In the preferred embodiment, two flanges 22 and two wall portions 34 are utilized. However, the ratchet fastener 10 works just as effectively with more than two flanges 22 and an equal number of wall portions 34 being utilized. The only requirement is that the flanges 22 be dimensioned to fit within the teeth 32 and to allow the post 20 to advance into the post receiver 30.

To further aid advancement of the post 20 from tooth 32 to tooth 32 in accordance with the ratchet arrangement of the present invention, the fastener post 20 is separated in the preferred embodiment into two elongated prongs 24. The prongs 24 attach to the base 25 of the fastener post 20, and extend therefrom. In this way, the prongs 24 are integral to base 25. The two prongs 24 are separated by a post channel 26. The presence of the post channel 26 allows the diameter of the post 20 formed by the two elongated prongs 24 to be reduced as the flanges 22 come into contact with each tooth 32. This facilitates insertion of the post 20 into the receiver 30 while allowing the flanges 22 to snap back into the teeth 32 as the post 20 is advanced into the receiver 30.

The preferred embodiment of the present invention also provides for a biasing member 28 within the post 20. The biasing member 28 is placed at the distal end 21 of the post 20 to restore the radius of the post 20 as the flanges 22 progress along the teeth 32. This permits the flanges 22 to snap into place within the teeth 32 as the post 20 is advanced into the receiver 30. In the preferred embodiment, the biasing member 28 defines an elastomeric plug which connects the two prongs 24 of the post 20 within the distal end 21 of the post channel 26.

Figure 7:
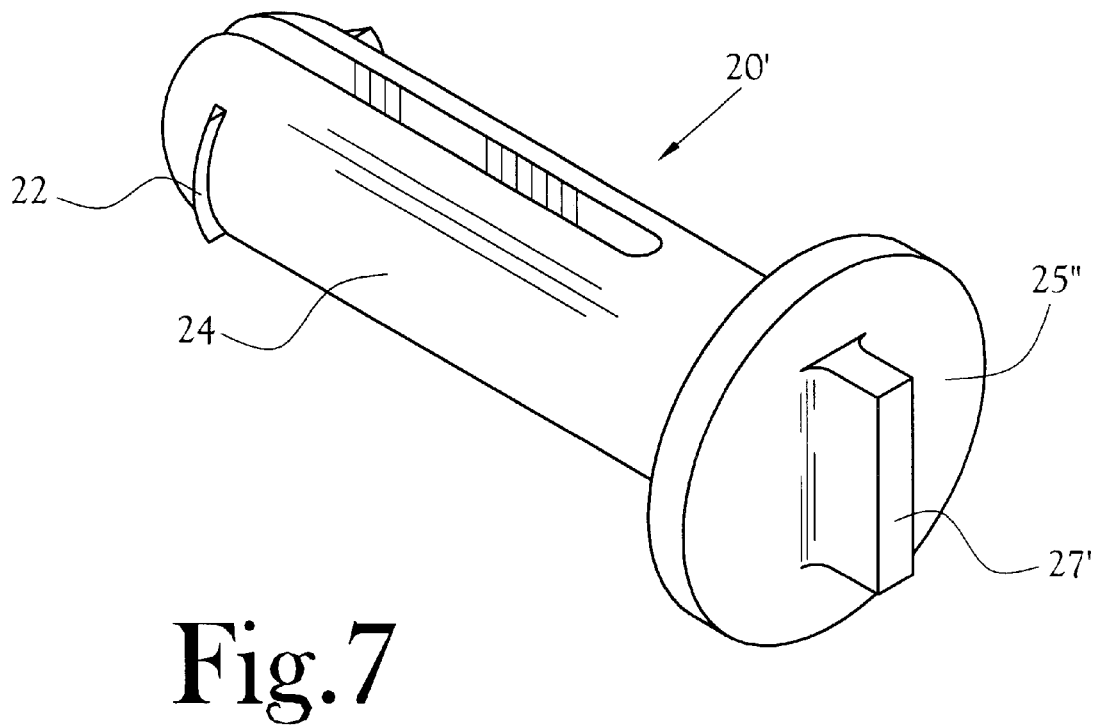
FIG. 7 is a perspective view of an alternate embodiment of a fastener post.

An additional feature is incorporated into the fastener 10 to allow the fastener post 20 to be quickly disconnected from the individual post receiver 30. This feature represents a means for rotating the fastener post 20. In the preferred embodiment, the rotational means comprises a slot 27 fabricated into the base 25 of the post 20 for receiving a screwdriver. However, those skilled in the art will recognize that other means exist, including the use of a base 25' which is capable of being gripped and rotated by hand. Such an embodiment is shown in FIG. 7.

Rotation of the fastener post 20 and 20' enables the flanges 22 of the post prongs 24 to be released from the teeth 32 of the post receiver 30. This, in turn, allows the fastener post 20 and 20' to be slidably withdrawn from the post receiver 30. Where two prongs 24 and two corresponding wall portions 34 are employed, rotation of the base would be to an approximate 90° angle for separation of the members 20 and 30.

The fastener 10 of the present invention is designed to be incorporated into separate articles to be joined. To fulfill this purpose, it is necessary to incorporate the base 25 of the post 20 into one article, and the base 35 of the post receiver 30 into another article (articles not shown). Such articles could be anything, such as parts to a child's toy box to be assembled, or a tool and a wall. In one method, the base 25 post 20 and the base 35 of the receiver 30 are connected to their respective articles by means of solvent bonding. By this method, the fastener post 20 becomes integral to the first article, and the fastener post receiver 30 becomes integral to the second article.

Those skilled in the art will understand that other methods of connecting articles using the ratchet fastener 10 of the present invention exist. One alternate embodiment is depicted in FIG. 7. In this embodiment, the base 25' of the fastener post 20' serves as a washer to allow the post 20' to be received within a hole member (not shown) fabricated within an article. Those skilled in the art will understand that the diameter of the base 25' of the fastener post 20' is larger than the diameter of the hole member to allow the base 25' of the fastener post 20' to reside against the subject article.

From the foregoing description, it will be recognized by those skilled in the art that a fastener having advantages over the prior art has been provided. The fastener of the present invention includes a male post member and a female receiver member which are used to disconnectably attach two separate articles. While a preferred embodiment for the foregoing has been shown and described, it will be understood that the description is not intended to limit the disclosures, but rather is intended to cover all modifications and alternate methods falling within the spirit and the scope of the invention as defined in the appended claims.

What is claimed is:

1. A fastener comprising:
    a post including a base and a plurality of elongated prongs, each of said plurality of elongated prongs defining a proximal end integral to said post base, and a distal end from which at least one flange extends therefrom, said plurality of elongated prongs defining a post channel therebetween; and
    a receiver adapted to releasably receive said post, said receiver including a base and a plurality of wall portions corresponding to said plurality of elongated prongs, each of said plurality of wall portions defining a distal end integral to said receiver base, each of said plurality of wall portions having a series of teeth configured to engage said at least one flange as said post is advanced into said wall portions of said receiver;
    whereby said post and said receiver are releasably mated without need for additional hardware.

2. The fastener of claim 1 wherein said receiver is fabricated from a flexible material.

3. The fastener of claim 2 wherein said flexible material is a polymer.

4. The fastener of claim 1 wherein said teeth of said receiver are staggered to provide a ratcheting connection.

5. The fastener of claim 1 further comprising a biasing member disposed between and outwardly biasing said plurality of elongated prongs.

6. The fastener of claim 5 wherein said biasing member is an elastomeric plug.

7. The fastener of claim 1 further comprising means for releasing said at least one flange from said series of teeth, thereby permitting said post to be removed from said receiver.

8. The fastener of claim 7 wherein said means for releasing includes a wall channel defined between said plurality of wall portions and a means for rotating said post within said receiver.

9. The fastener of claim 8 wherein said wall channel is a selected width to allow said flanges to move freely as said post is rotated by said means for rotating and is removed from said receiver.

10. The fastener of claim 9 wherein said at least one flange and said series of teeth prevent said post from being removed from said receiver without rotation of said post within said receiver.

11. A fastener comprising:
a post having a proximal end and a distal end, said post having a base at said proximal end and flanges at said distal end;
a receiver having a proximal end and a distal end, said receiver having a base at said proximal end of said receiver, and said receiver being configured to releasably mate with said flanges of said post within said receiver in such a manner as to maintain said post and said receiver in a mated position without need for hardware.

12. The fastener of claim 1
wherein said post further defines a plurality of elongated prongs having proximal and distal ends, said proximal ends of said prongs being integral to said base of said post, and said distal ends of said prongs each having one of said flanges, and
wherein said distal end of each of said prongs is separated by a post channel.

13. A fastener comprising:
a post having a proximal end and a distal end, said post having a base at said proximal end and flanges disposed laterally proximate said distal end;
a receiver having a proximal end and a distal end, said receiver having a base at said proximal end of said receiver, and said receiver being configured to releasably mate with said flanges of said post within said receiver in such a manner as to maintain said post and said receiver in a mated position without need for hardware;
wherein said post further defines:
a plurality of elongated prongs having proximal and distal ends, said proximal ends of said prongs being integral to said base of said post, and said distal ends of said prongs each having one of said flanges, and
wherein said distal end of each of said prongs is separated by a post channel;
wherein said receiver further defines:
a plurality of wall portions to correspond with said plurality of elongated prongs of said post, each of said plurality of wall portions having proximal and distal ends, with said distal end of each of said wall portions being integral to said base of said receiver, and each of said wall portions having a series of teeth configured to receive one of each of said flanges of said prongs of said post as said post is advanced into said wall portions of said receiver; and
wherein said distal end of each of said plurality of wall portions is separated by a receiver channel, said receiver channels allowing said wall portions of said receiver to engage said prongs of said post when attempt is made to withdraw said post from said receiver, thereby maintaining said post and said receiver in an essentially secure mated position.

14. The fastener of claim 13 wherein the number of said plurality of elongated prongs of said post is two, and wherein the number of said plurality of corresponding wall portions of said receiver is two.

15. The fastener of claim 14 wherein said receiver is fabricated from a flexible material.

16. The fastener of claim 15 wherein said flexible material is a polymer.

17. The fastener of claim 15 wherein said teeth of said receiver are staggered to provide a ratcheting connection.

18. The fastener of claim 15 wherein said post further includes a biasing member near said distal end of said prongs placed within said post channel of said post and connected to each of said prongs, said biasing member biasing said prongs of said fastener post to maintain said separation of said prongs as said flanges enter said teeth of said receiver.

19. The fastener of claim 18 wherein said biasing member is an elastomeric plug.

20. The fastener of claim 15 further comprising means for allowing rotation of said fastener post, thereby enabling said post to be rotated so as to release said flanges from said teeth, and thereby permitting said post to be quickly removed from said receiver.

21. The fastener of claim 20 wherein said means for allowing rotation of said fastener post defines a slot placed in said base for receiving a screwdriver.

22. The fastener of claim 21 wherein said means for allowing rotation of said fastener post defines a configuration of said base which allows said base to be gripped by hand and rotated.

23. A fastener comprising:
a post having a proximal end and a distal end, said post having
a base at said proximal end of said post;
two elongated prongs having proximal and distal ends, said proximal ends of said prongs being integral to said base, and each of said prongs having a flange near said distal ends of said prongs; and
a post channel separating said two prongs at said distal end of said prongs; and
a receiver fabricated from a polymer material, said receiver having a proximal end and a distal end, and said receiver being configured to mate with said post, said receiver having
a base at said proximal end of said receiver;
two wall portions to correspond with said two elongated prongs of said post, each of said wall portions having proximal and distal ends, with said proximal ends of said wall portions being integral to said base of said receiver, and each of said wall portions having a series of teeth configured to receive one of each of said flanges of said prongs of said post as said post is advanced into said wall portions of said receivers; and receiver channels separating said wall portions of said receiver at said distal ends of said wall portions, said receiver channels allowing said wall portions of said receiver to engage said prongs of said post when attempt is made to withdraw said post from said receiver, thereby maintaining said post and said receiver in an essentially secure mating position;

an elastomeric biasing member near said distal end of said prongs placed within said post channel of said post and connected to each of said prongs, said biasing member biasing said prongs of said fastener post to maintain said separation of said prongs as said flanges enter said teeth of said receiver; and a slot in said proximal end of said base of said post for receiving a screwdriver, thereby enabling said post to be rotated about 90° within said receiver when the screwdriver is turned so as to release said flanges from said teeth, and thereby permitting said post to be quickly removed from said receiver.

* * * * *